United States Patent [19]
Salesky et al.

[11] Patent Number: 5,087,870
[45] Date of Patent: Feb. 11, 1992

[54] CONSTANT POWER CIRCUIT

[75] Inventors: Emery Salesky, Denville; Tom Sterk, Newfoundland, both of N.J.

[73] Assignee: Hewlett-Packard Company, Palo Alto, Calif.

[21] Appl. No.: 417,372

[22] Filed: Oct. 5, 1989

[51] Int. Cl.$^5$ .............................................. H02M 3/26
[52] U.S. Cl. ...................... 323/276; 323/274; 323/275; 323/293.1; 361/18; 361/26; 361/87
[58] Field of Search ............ 323/265, 273, 274, 275, 323/280, 282, 283, 284, 285, 349, 351, 906, 276, 293; 361/18, 86, 87, 88

[56] References Cited

U.S. PATENT DOCUMENTS

| | | | |
|---|---|---|---|
| 4,404,472 | 9/1983 | Steigerwald | 323/906 X |
| 4,678,983 | 7/1987 | Rouzies | 323/285 X |
| 4,837,653 | 6/1989 | Yip | 323/276 X |
| 4,899,269 | 2/1990 | Rouzies | 323/906 X |

Primary Examiner—Steven L. Stephan
Assistant Examiner—Emanuel Todd Voeltz
Attorney, Agent, or Firm—Frank R. Perillo

[57] ABSTRACT

A constant power circuit for causing a constant power level to be dissipated by a load when an overpower condition is detected. The overpower condition is detected by measuring the voltage across and current drawn by the load in accordance with a programmed load value and determining whether the sum of the measured current and voltage exceeds the power limit for the load. In a preferred embodiment, the sum of the voltage and current is compared to a linear piecewise approximation of a constant power curve in the current-voltage plane, the curve representing the power limit for the load for the range of current and voltage magnitudes in which the load circuit may safely operate. When an overpower condition is detected, the power is dissipated by the load at a constant power level defined by the constant power limit by oscillating the power level within a hysteresis band about the constant power limit. The hysteresis effect prevents the power level dissipated by the load from dropping much below the constant power limit of the load. The output of a power stage is then driven to follow the oscillating output power level until the overpower condition is no longer detected. In this manner, the load may receive a constant power level which is independent of the impedance of the power source driving the load.

23 Claims, 6 Drawing Sheets

CONSTANT POWER CIRCUIT

BACKGROUND OF THE INVENTION

1. Field of the Invention

The present invention relates to a constant power circuit for controlling a load such that it dissipates power at a constant power level during an overpower state of the load. More particularly, the constant power circuit of the present invention limits to a constant safe level the power dissipated by an electronic load during transient and steady-state conditions of the electronic load.

2. Description of the Prior Art

An electronic load of the type to which the present invention is directed is an electronic circuit which generally comprises channeled FETs for dissipating large amounts of power applied to inputs thereof. Such an electronic load has several independently programmable modes and is typically applied to the output of a power source for checking the response characteristics of the power source. For example, the power source may be tested by connecting its output across the electronic load and independently programming the electronic load to have a specified constant current mode or constant voltage mode or to have a specified constant of proportionality for a mode in which the current is linearly proportional to the voltage. By so selecting a particular mode and load demand values (constant current levels and the like), a user of the electronic load can control the nature of the load and hence the amount of power dissipated thereby so that the power source characteristics can be monitored for different load demands.

Prior art electronic load circuits of the type just described typically provide negative feedback control to maintain steady-state conditions for measurement. However, a problem occurs in such devices of the prior art in that when the electronic load is switched by the user from one regulatory mode to another or from one level to another the power dissipated by the electronic load may temporarily exceed the power limit of the electronic load circuitry. In other words, although the voltage, resistance and/or current are maintained relatively constant by feedback control, the power dissipated by the electronic load still may be too great for the circuitry of the electronic load, thereby causing overheating of its components. As a result, disconnection of the electronic load from the power source or some other load control measure has to be taken.

Disconnection of the electronic load during an overpower condition is not desirable since it is necessary that the electronic load remain connected to the power source throughout testing procedures for accurate test measurements to be taken. Furthermore, it is desirable to monitor the power source characteristics when the electronic load is switched from a constant current to constant voltage or constant resistance mode and the like or when the level of the constant current or constant voltage is changed. However, some overpower protection must be provided in such cases to prevent the electronic load circuitry from being damaged when the electronic load is caused to dissipate more power than its circuitry can safely handle.

One approach to the above problem has been to provide no overpower protection at all. Rather than provide such overpower protection, thermal shutdown of the electronic load circuit occurs when an overpower condition is detected. However, such an approach has the obvious problem that by the time the thermal sensor determines that an overpower condition has occurred the transistors of the electronic load circuit may be irreparably damaged.

Another approach to the above problem has been to provide "soft overpower" protection. In this technique, the voltage and current passing through the electronic load are measured and the product of the voltage and current is calculated by a microcomputer. The microcomputer then takes appropriate action to prevent the electronic load from being driven in an overpower condition. However, such a technique is not preferable since the circuitry can be quite expensive and since a substantial amount of processing time is often required for the overpower condition to be determined and then corrected. A faster and less expensive solution is desired.

Figure 1:
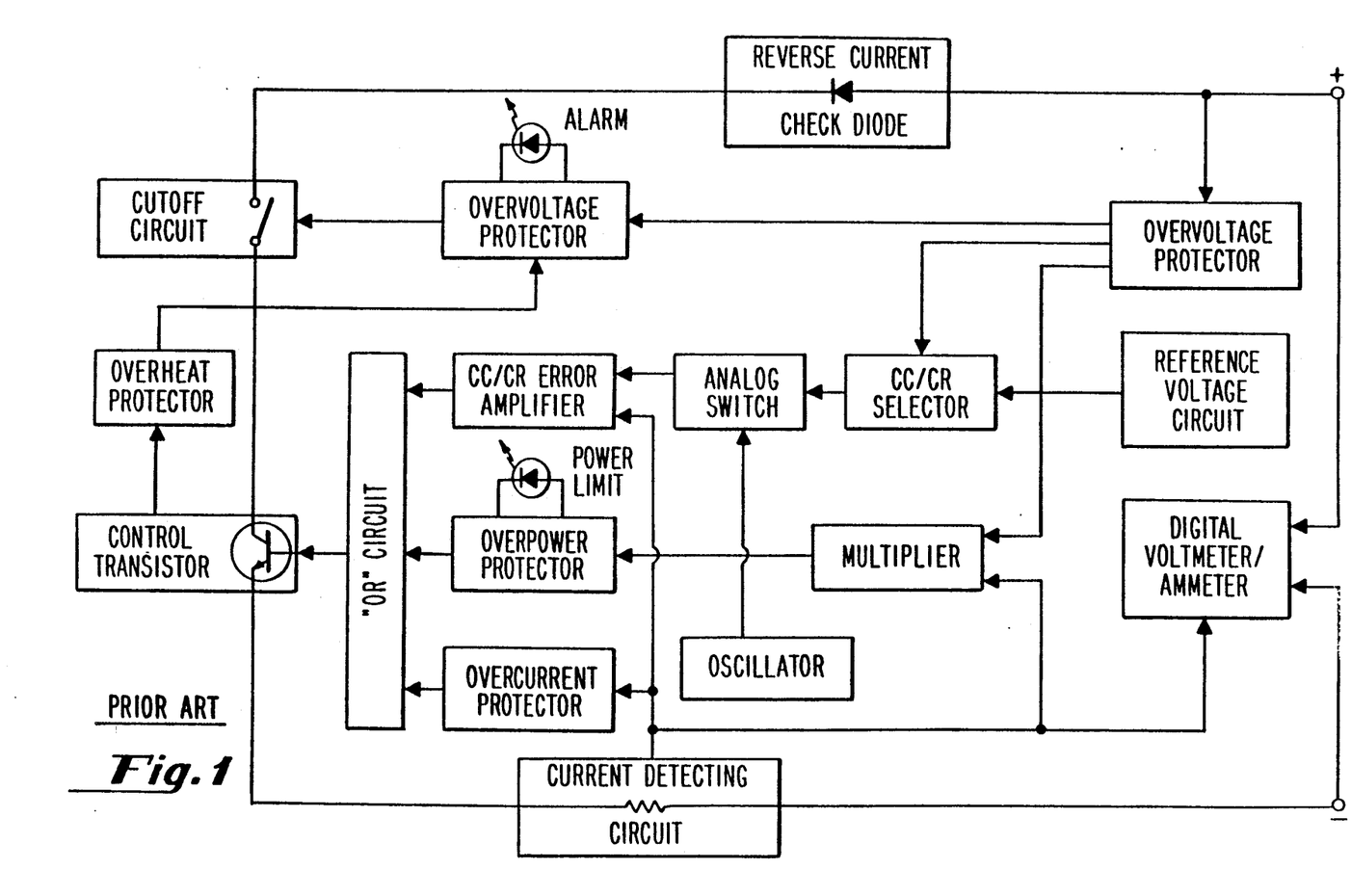
FIG. 1 shows a power limit circuit of the prior art in which a linear loop including an analog multiplier is used to limit the power dissipated by the load.

An analog multiplier has been used to shorten the processing time for determining the overpower condition. As shown in FIG. 1, for example, an analog multiplier has been used to generate a voltage which represents a product of signals that are proportional to the detected current and voltage. The resulting power level is then limited by a control transistor which is controlled to regulate the power dissipated. However, such a circuit has the limitations that a separate linear negative feedback control loop responsive to the current and voltage is provided for protecting from an overpower condition, as shown in FIG. 1. Due to the linear nature of this control loop, it must be compensated with respect to the customer's power source characteristics to account for such problems as differing impedances at the output of the power source. Such compensation tends to be expensive and requires a significant amount of calibration time since manual adjustment of the analog multiplier is often necessary.

SUMMARY OF THE INVENTION

The constant power circuit of the present invention overcomes the above-mentioned problems in the prior art by switching the electronic load during an overpower state to a constant power mode in which nonlinear control of the electronic load is provided so as to limit the power dissipated by the electronic load during the overpower state.

More particularly, the constant power circuit of a preferred embodiment causes the load, which has a predetermined power limit, to dissipate power at a constant power level less than the predetermined power limit by detecting an overpower state of the load and regulating using nonlinear feedback means the level of the power dissipated by the load so as to remain at the constant power level during the overpower state.

The preferred embodiment is further characterized in that the nonlinear feedback means regulates the level of the power dissipated by the load during the overpower state so as to be within a predetermined hysteresis band about the constant power level, the nonlinear feedback means also having steady states at a power level present when the load is zero and at a power level dissipated by the load when a programmed load demand is applied to the load.

The present invention also relates to a constant power circuit for causing a load having a predetermined power limit to dissipate power at a constant power level less than the predetermined power limit wherein means responsive to the voltage across and current drawn by the load are arranged for determining whether the power dissipated by the load for a selected load demand exceeds the predetermined power limit for the load, the determining means comparing the power dissipated by the load for the selected load demand with an approximation of a constant power curve over a predetermined range of current and voltage and outputting an overpower signal during an overpower state in which the predetermined power limit for the load is exceeded by the power dissipated by the load for the selected load demand. The circuit of the invention also includes means responsive to the overpower signal and the selected load demand for regulating the power dissipated by the load during the overpower state such that the magnitude of the power dissipated by the load during the overpower state is within a predetermined hysteresis band about the constant power level.

DETAILED DESCRIPTION OF THE PRESENTLY PREFERRED EMBODIMENT

During normal operation, an electronic load circuit of the type to which the present invention is directed operates in constant resistance, constant voltage or constant current modes at levels selected by the user of the electronic load. When these modes cause an overpower condition to be detected, circuit damage is prevented in accordance with the invention by switching from one of the three regulatory modes of constant resistance, constant voltage or constant current to a constant power mode so that the current and/or voltage may be regulated to keep the overall power dissipated by the electronic load substantially constant.

In the preferred embodiment of the invention, a multivibrator is used as the regulating mechanism for maintaining the power dissipated by the electronic load substantially constant. Therefore, unlike the prior art, the regulating mechanism of the invention does not function in a linear manner and instead functions like a bimetallic thermostat in a home heating system. For example, when the power dissipated by the electronic load exceeds a predetermined power level anywhere over the entire operating range of voltage and current, the power stage of the present invention starts to turn off. However, rather than turning completely off, when the power dissipated by the electronic load drops below the predetermined power level plus a small amount of hysteresis, the power stage starts to turn back on. Then, once the predetermined power level is again exceeded, the power stage starts to turn off again to force the level of the dissipated power to fall back below the predetermined power level. The power dissipated by the electronic load oscillates about the predetermined power level in this manner until the overpower condition is no longer detected.

The regulating mechanism of the invention is inherently stable in that the level of the dissipated power tends towards two steady states, namely, a zero state (when no load is present) and a programmed state representative of the load demand requested by the user. The power dissipated by the electronic load is thus regulated about the predetermined power level within a hysteresis band between the steady states regardless of the power source characteristics. As a result, manual compensation and additional amplifiers and passive components are not required as when a linear feedback loop is used, thereby enabling the present invention to be constructed relatively inexpensively.

Figure 2:
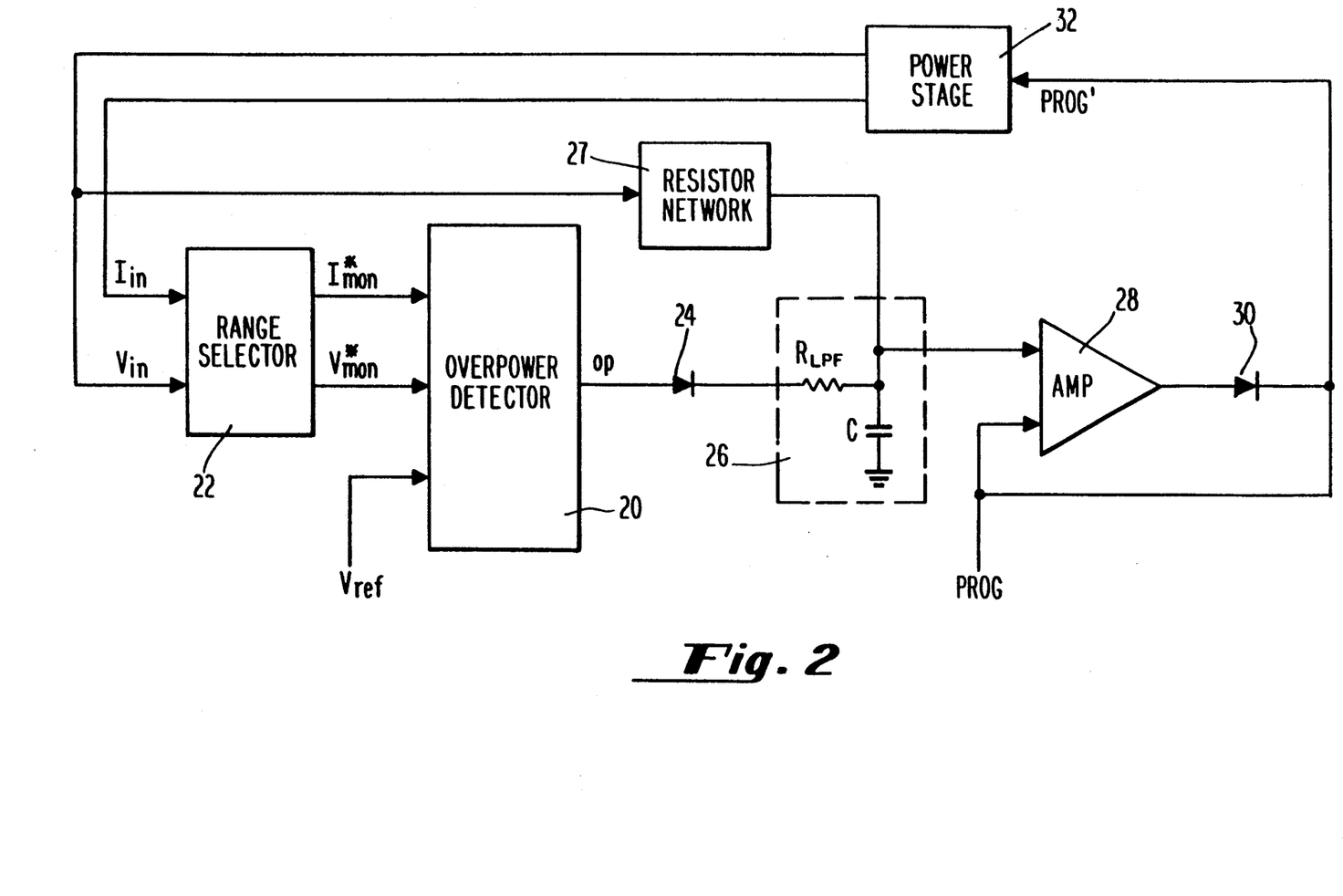
FIG. 2 is a block diagram depicting a preferred embodiment of a constant power circuit in accordance with the present invention.

The constant power circuit of the present invention is shown in detail in FIG. 2. As shown therein, the present invention principally comprises an overpower detector circuit 20 which receives signals I*mon and V*mon, which are respectively proportional to the actual current signal $I_{in}$ and voltage signal $V_{in}$ from range selector 22 for comparison with a reference level $V_{ref}$ for determining whether an overpower condition is present. If an overpower condition is present, overpower detector circuit 20 outputs an overpower signal OP which passes through decoupling diode 24 and low pass filter 26 into one input of linear differential amplifier 28. The voltage across the capacitor C of low pass filter 26 is maintained at a level just below the input voltage $V_{in}$ by resistor network 27 so that the output of the low pass filter 26 can effectively "track" the measured voltage $V_{in}$ and minimize the rise time of the capacitor. The other input of linear differential amplifier 28 receives a signal PROG which represents the programmed power level of the power to be dissipated by the electronic load in response to a load demand selected by the user of the electronic load. The output of amplifier 28 passes through decoupling diode 30 in a positive feedback arrangement whereby the signal PROG is adjusted to PROG' during an overpower state such that the output power of the power stage 32 may be controlled to track the overpower signal to maintain a constant power level until a normal operating state is regained.

The circuit so arranged functions such that when the user has selected a load demand which causes more power to be dissipated by the electronic load than that acceptable by the electronic load circuitry the constant power circuit limits the power dissipated by the electronic load and drives the electronic load at a safe constant power level until the overpower condition is eliminated. As noted above, in prior art circuits of this type the constant current and constant voltage circuitry must be compensated for stability because of their linear nature. Such circuits are thus affected by the wide range of characteristics of the power source under test. For example, the power source under test may have very high impedance as with a constant current source or very low impedance as with a constant voltage source. In addition, the power source under test might be capacitive or inductive. However, the present invention does not require such compensation since it has been designed to operate in a nonlinear manner and thus substantially independent of the characteristics of the power source. As will be described below, this is accomplished in the preferred embodiment by using a hysteresis type (or positive) feedback arrangement rather than a negative feedback arrangement which generally requires compensation.

In general, a constant power circuit as described above requires a means of overpower detection, which, as noted in the background portion of the specification, has typically included an analog multiplier as in FIG. 1. However, as noted above, such an analog multiplier tends to be expensive and may require calibration. Accordingly, overpower detector circuit 20 of the present invention has been designed to add rather than multiply the voltage and current signals and to use a piece-wise linear approximation to a constant power boundary such as the maximum power boundary for the electronic load. For example, the constant power boundary is selected at range selector 22 to approximate the maximum power boundary for the circuitry of the electronic load without exceeding the tolerances of the components.

The overpower detector circuit 20 of FIG. 2 will now be described in more detail with reference to FIG. 3.

Figure 3:
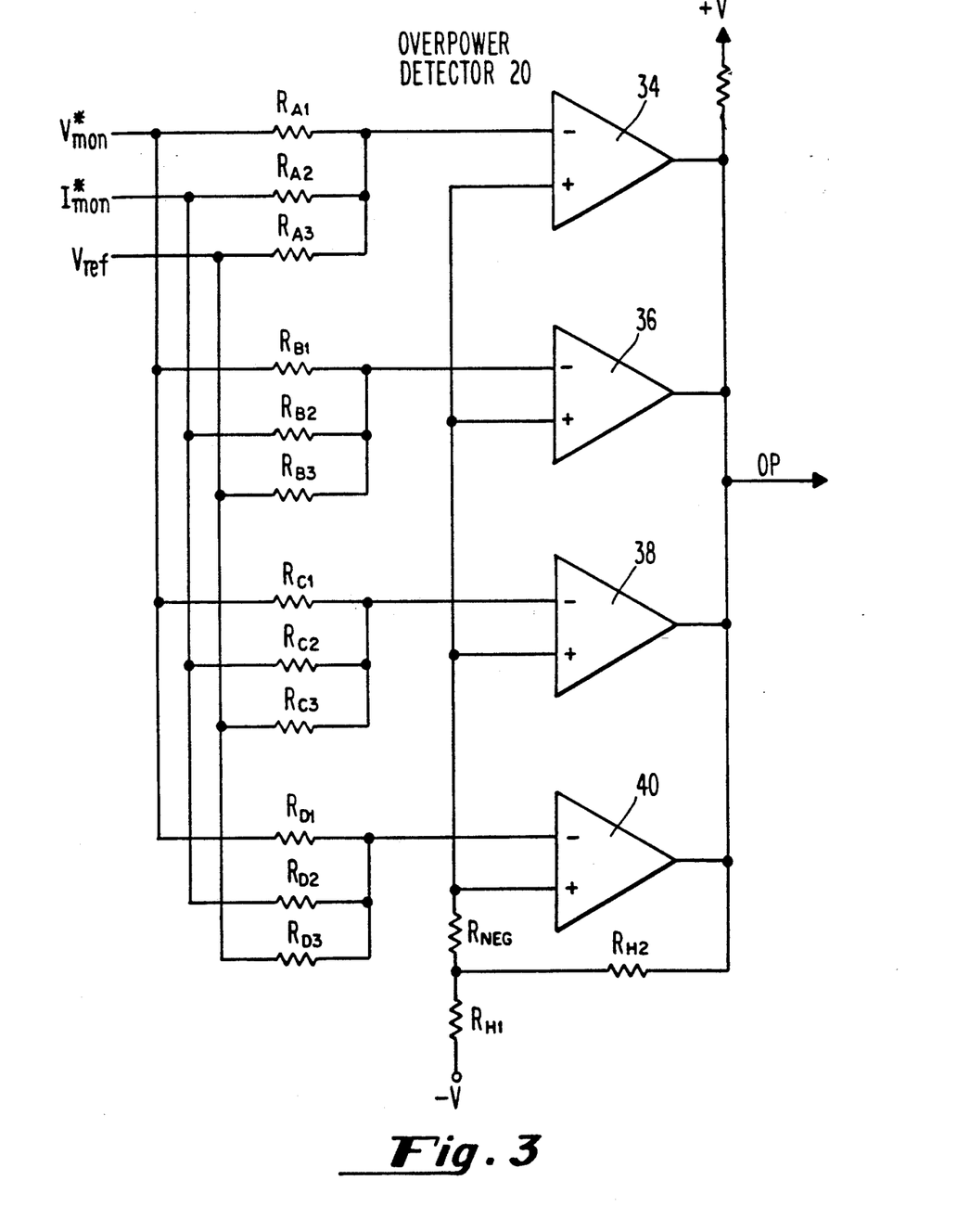
FIG. 3 is a circuit diagram of a preferred embodiment of the overpower detector circuit 20 of the embodiment of FIG. 2.

The overpower detector circuit 20 of FIG. 3 consists of a resistor network and one or more analog comparators. Since the comparators function as two-state devices (high and low), they allow the circuit of the present invention to function as a multivibrator regulator which has stable states at the power level where no load is present and at the programmed power level corresponding to the load demand requested by the user (which is presumably above the power level acceptable by the electronic load circuit). The overpower detector circuit 20 of FIG. 3 protects the electronic load from an overpower condition by determining whether the constant power limit of the electronic load has been exceeded and by preventing the power dissipated by the electronic load from increasing more than a predetermined amount above the constant power limit of the electronic load.

Figure 4A:
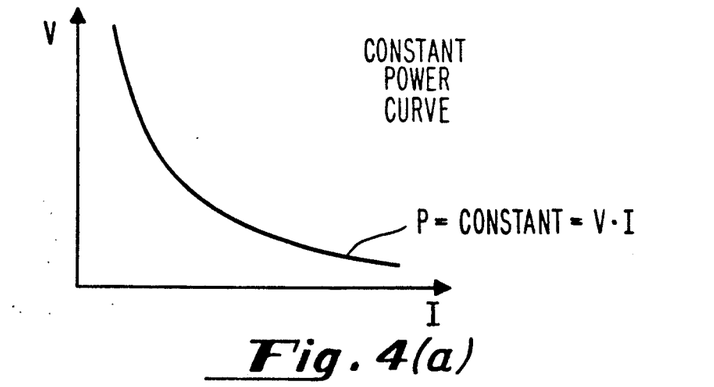
FIGS. 4(a)-4(c), graphically represent the principle of operation of the overpower detector circuit 20 of FIG. 3.

More particularly, the circuit of FIG. 3 determines if the constant power limit has been exceeded by comparing the power level of the power dissipated by the load to an ideal constant power curve in the current-voltage plane defined by an invariant product of the actual voltage and current. As shown in FIG. 4(a), for example, the power level is constant for points along a hyperbola in a specified portion of the current-voltage plane. The hyperbolic constant power curve is defined generally as P=VI=constant as shown and can be approximated by piece-wise linear segments as will be described below.

Figure 4B:
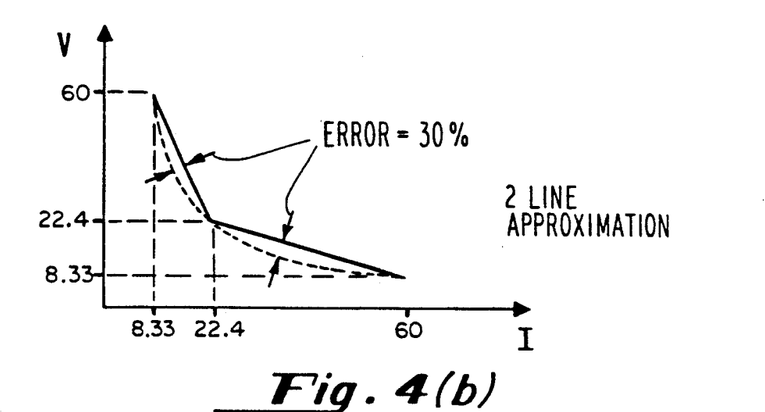
Figure 4C:
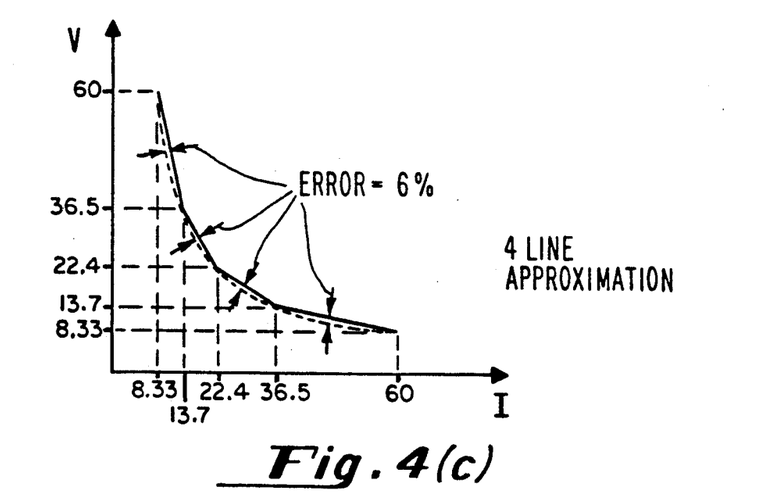

The circuit of FIG. 3 replaces the product of the current and voltage with a straight line approximation to the constant product curve shown in FIG. 4(a). Analog comparators are preferably used for this approximation due to their high speed and low cost. As shown in FIG. 4(b), for example, a two line approximation to the constant power curve of FIG. 4(a) can approximate the constant power curve within an error range of 30% by having each analog comparator compare the sum of the measured current and voltage with a reference $V_{ref}$ which corresponds to the level of the constant power curve. The straight line segments for the approximation are defined by minimizing the deviation between the constant product curve of FIG. 4(a) and the maximum distance to each straight line. Each line is selected to have the same maximum deviation from the constant product curve, and the line is chosen such that the actual power boundary of the electronic load is not exceeded for any line segment. Moreover, as necessary, the accuracy of the straight line approximation to the constant product curve can be improved by adding more lines and the corresponding number of comparators. As shown in FIG. 4(c), for example, a four line approximation provides an accuracy of within 6% of the constant product curve, which is acceptable for most commercial purposes. The corresponding circuitry for such an embodiment is shown in FIG. 3.

By way of example, the overpower detector circuit 20 of FIG. 3 may be designed to define a 500 watt power boundary (P=VI=500W) for a voltage limited to 60 V and a current limited to 60 A as shown in FIGS. 4(b) and 4(c). Using four line segments, the straight line approximation introduces a 6% overpower error that a true multiplication would eliminate; therefore, the absolute power boundary of the electronic load circuitry must be at least 500W33 1.06=530W. If such is not the case, the constant power boundary may be lowered at range selector 22 (FIG. 2). For such an example, the two inputs to the overpower detector circuit 20 may be 0 to −10 volt signals that correspond to zero to full scale (60 volts and 60 amperes) and are represented as I*mon and V*mon in FIG. 3. These inputs values may be achieved by scaling the actually detected input current signals $I_{in}$ and voltage signals $V_{in}$ using range selector 22.

The straight line circuit for approximating the constant power curve in accordance with a preferred embodiment of the invention comprises four comparators 34-40 with respective reference levels defined by $V_{ref}$. Each comparator defines one of the four straight line segments as shown in FIG. 4(c), with each line having a different slope. The reference voltage $V_{ref}$ and the V*mon and I*mon inputs are connected to each comparator through separate resistors, the values of which determine the slope and intercept along the current-voltage axes of the segment represented by each comparator. In other words, by varying the values of resistors RA1—RD1, RA2—RD2 and RA3—RD3 the comparators can be set to approximate the constant power curve. For example, the V intercept may be determined by the ratio of resistors RA1 and RA3 for comparator 34, while the I intercept may be determined from the ratio of resistors RA2 and RA3. The same is true for the other comparators 36, 38 and 40.

If the sum of the values of V*mon and I*mon exceed the power limit determined by a line segment for a particular comparator, that comparator's output changes state, and if the sum of the values of I*mon and V*mon exceeds the power limits for all line segments, an overpower condition is indicated. The comparators may have open collector output stages so that the outputs of all four comparators 34-40 may be wire ORed together and connected through a common resistance to a high voltage +V and through a common resistance $R_{neg}$ to a low voltage −V such that if one comparator output goes low, thereby indicating the power limit is not exceeded, the output OP is pulled low (to −V). Accordingly, only when the segments identified by all of the comparators are exceeded will the comparator output OP indicate an overpower condition. In other words, overpower signal OP will be outputted to indicate that the instantaneous voltage and current values identify a point on the current-voltage plane which is above and to the right of all line segments of the type shown in FIG. 4(c).

Although the embodiment described above was designed with comparators, one for each line segment, a more generalized version may use nonlinear amplifiers rather than comparators to achieve a nonlinear response rather than a cycle limit. However, a design utilizing comparators is presently preferred since the resulting circuit has a lower cost, is less complex, has a high speed and high accuracy. Moreover, the circuit shown in FIG. 3 can be realized using only one integrated circuit, a quad comparator, which yields an inaccuracy of only 6% due to the straight line approximation, which is sufficient for the overpower detector circuit 20 for most purposes. As described above, additional accuracy can be achieved by increasing the number of line segments and hence comparators. Also, since the speed of the circuit of FIG. 3 is limited only by the speed of the comparators, the resulting circuit can be very fast in comparison with the circuits of the prior art.

The operation of the circuit of FIG. 2 will now be described in detail in conjunction with the waveform diagrams of FIGS. 5 and 6.

The actual current $I_{in}$ and voltage $V_{in}$ measured across the electronic load are input into range selector circuit 22, and signals $I^*mon$ and $V^*mon$ are output, these signals being proportional to the measured values (FIGS. 5(a)-(b)). As described above, range selector 22 also may include analog switches for providing dual range capabilities whereby the constant power curve shown in FIG. 4(a) may be effectively shifted outward or inward to account for different power limit ranges with different constant power values. $I^*mon$ and $V^*mon$ are then input into the resistor network of overpower detector circuit 20 along with the reference value $V_{ref}$, which may be chosen so as to be opposite in polarity with $I^*mon$ and $V^*mon$ such that each of the comparators may detect when the sum of its three signals plus hysteresis equals zero. The hysteresis is provided by resistors RH1 and RH2 and results in a signal having the magnitude and frequency shown in FIG. 5(c), for example. The magnitude and frequency of this hysteresis effect may be adjusted by changing the values of resistors RH1 and RH2 shown in FIG. 3 (i.e., the pulse width of the overpower signal OP is varied). The resulting overpower signal is shown in FIG. 5(d).

Overpower signal OP is then connected through a decoupling diode 24 to a low pass filter 26. A capacitor C of the low pass filter 26 is then charged by the overpower signal OP through the decoupling diode 24, which allows the comparators to switch between the high and low states while maintaining the output of the low pass filter at a relatively constant voltage. In addition, the capacitor C is pre-charged to a level just below the power limit of the electronic load so that response time is improved. As shown in FIG. 2, this is done by connecting the capacitor C of low pass filter 26 through resistor network 27 to the voltage input $V_{in}$. As a result, as the input voltage to the electronic load changes during an overpower state, the capacitor charge level is appropriately adjusted so as to "track" the input voltage.

Figure 5:
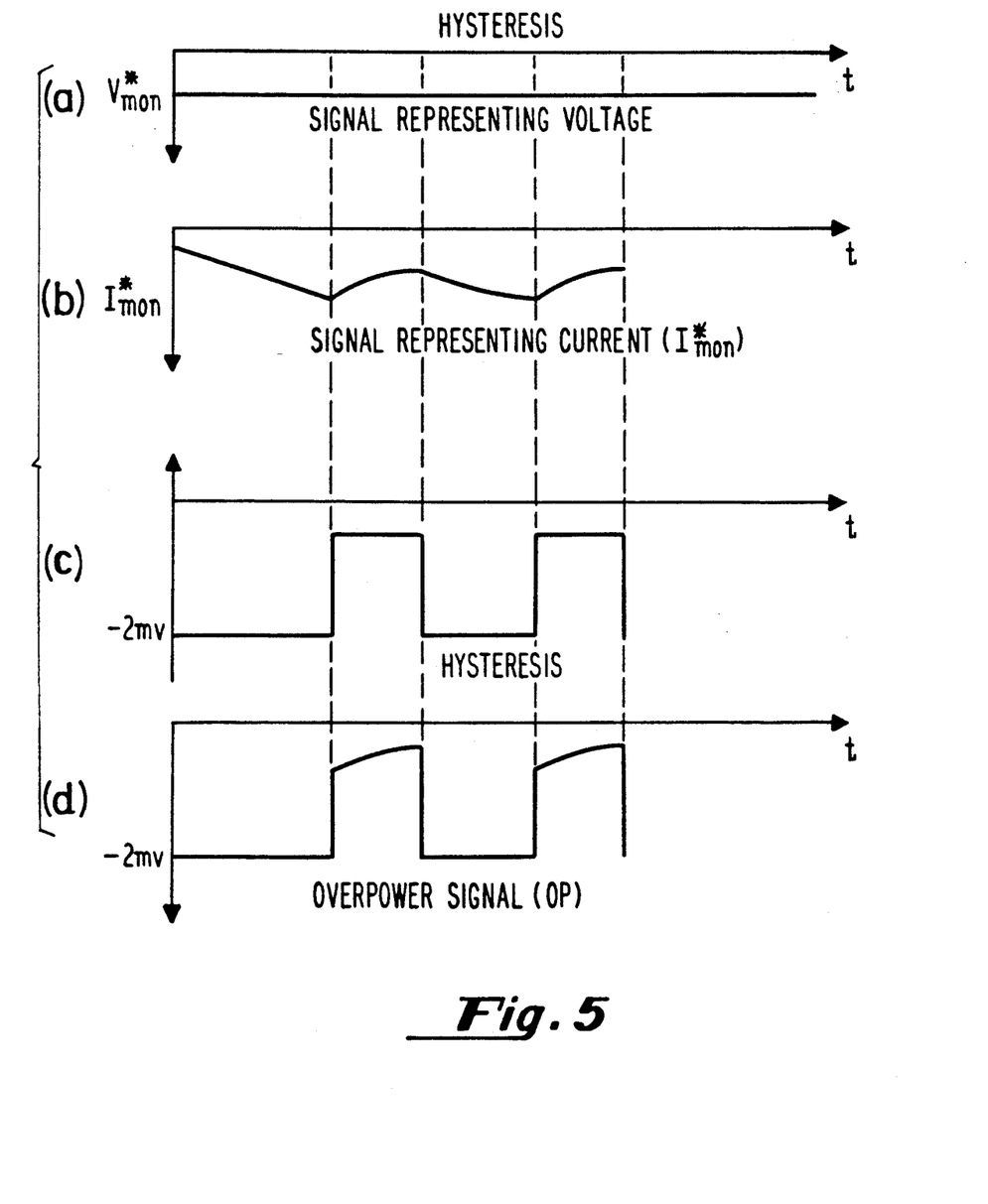
FIGS. 5(a)-5(d) represent the hysteresis principle of the overpower detector circuit 20 of FIG. 3.
Figure 6:
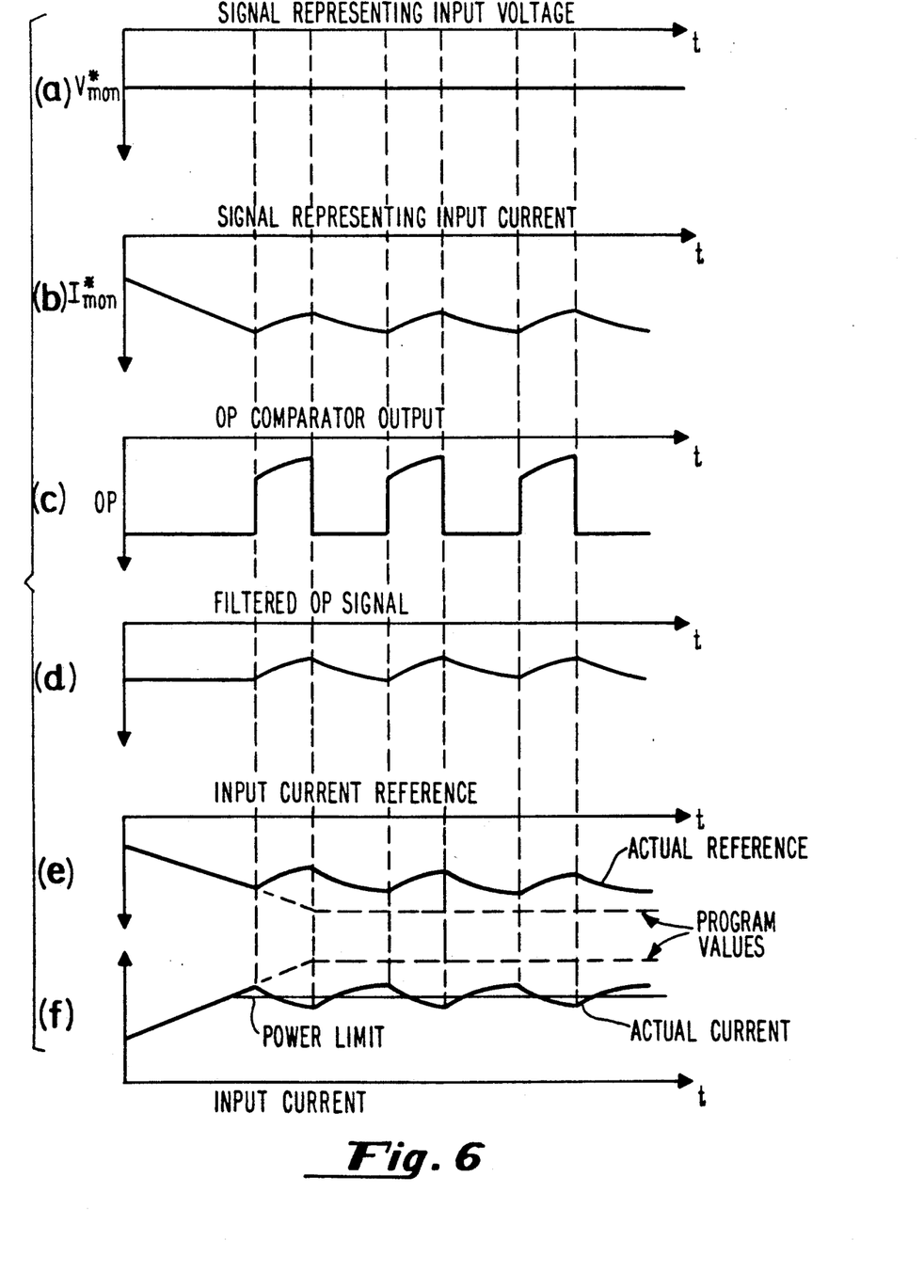
FIGS. 6(a)-(f) represent waveform diagrams of the circuit of FIG. 2 during operation.

FIG. 6 shows the curves of FIG. 5 (FIGS. 6(a)-(c)) placed on the same time axis with the output signals (FIGS. 6(d)-(f)). FIG. 6(d) shows the output of low pass filter 26 as input into one input of amplifier 28, while FIGS 6(e)-(f) show the resulting power control signals supplied to the power stage 32. Determination of these signals will now be described with respect to FIGS. 6(e)-(f).

The electronic load current (and hence power) is controlled by the value at the node labelled PROG. PROG represents the load demand for the electronic load as previously described. This node is common to and within each of the regulating loops which regulate constant current, constant voltage and constant resistance of the electronic load and would be controlled by them during normal operation. In fact, decoupling diode 30 decouples the power control loop through amplifier 28 during normal circuit operation (no overpower condition) so that PROG can be supplied directly to output stage 32 and the other regulating loops maintained. On the other hand, when an overpower condition is detected, the level of PROG is adjusted to PROG' in the power control loop through amplifier 28 whereby the electronic load is switched to a constant power mode which is regulated as follows.

PROG is applied to the other input of linear differential amplifier 28 for comparison with the filtered overpower signal OP which tracks the input voltage as previously described. When an overpower condition occurs and the capacitor C of the low pass filter 26 is charged above the voltage at PROG by the overpower signal OP, amplifier 28 detects this and outputs a signal PROG' which overrides the voltage at PROG so that it approximates the voltage on the capacitor C as shown in FIG. 6(e). The electronic load current is then regulated by the control value PROG' which is applied to the power stage 32 as shown in FIG. 2. The amplifier 28 output thus functions to override the constant current, constant voltage and constant resistance control loops which are ordinarily used during normal operation of the electronic load to maintain constant the programmed load demand.

As the current through the power stage 32 is regulated, the voltage and current across the electronic load changes. An instantaneous indication of the actual operating conditions is input into the overpower detector circuit 20 as previously described so that closed loop control of the power level dissipated by the electronic load may be achieved. The comparator outputs change appropriately as the input power level changes, as does the output of low pass filter 26. In this way, the actual operating conditions of the electronic load are noted, evaluated for overpower and regulated. The resulting electronic load current can be seen in FIG. 6(f). When normal operation is resumed, the decoupling diode 30 decouples the amplifier 28 so that PROG is reapplied to the power stage 32 to control the power dissipated by the electronic load.

In summary, during operation of the constant power circuit of the invention, the user specifies a particular load demand for the electronic load, and this load demand is represented by the program value PROG as shown in FIGS. 6(e)-(f). When the load demand causes the electronic load to dissipate power at a level which exceeds that acceptable by the electronic load circuitry, the electronic load is switched from the normal mode below the power limit (no overpower) to an overpower state in which a positive feedback arrangement including overpower detector circuit 20 causes the power level of the power dissipated by the electronic load to oscillate within a hysteresis band about the power limit of the electronic load (FIG. 6(f)). Such a hysteresis band is provided in the preferred embodiment since absence of such a band would cause the multivibrator to switch at an unacceptably high frequency; however, other nonlinear feedback arrangements are possible within the scope of the invention.

Next, as the input voltage across the electronic load increases, the capacitor C of the low pass filter 26 is charged to a positive level which, in turn, reduces the output of amplifier 28 so that the current level at which amplifier 28 starts to regulate the voltage at PROG may be correspondingly o lowered (PROG'). Then, in turn, once the actual power level is pushed back below the power limit of the electronic load, the overpower signal OP is no longer output by overpower detector circuit 20. The actual power level again starts toward the power level for the load demand requested by the user. The actual power level thus again rises as shown in FIG. 6(f) until the power limit is again exceeded. The power level of the power dissipated by the electronic load oscillates in this manner about the constant power level at the power limit of the electronic load until an acceptable load demand is requested by the user. Overheating of the electronic load circuit and undesirable switching out of the electronic load is thereby prevented.

The invention as thus arranged is particularly useful in an electronic load circuit for testing the response characteristics of a power source over the linear range of each comparator. Also, the invention is particularly advantageous since it maintains a constant power level for the power dissipated by the electronic load, the power level being independent of the impedance of the power source under test due to the nonlinear nature of the constant power circuit. The invention also has the benefit that it has guaranteed stability under all operating conditions, low component costs, a simple design, and no calibration components as when an analog multiplier is used.

Although only an exemplary embodiment of this invention has been described in detail above, those skilled in the art will readily appreciate that many modifications of the preferred embodiment are possible without materially affecting the novelty and advantages of this invention. For example, the present invention may be implemented digitally by providing analog to digital conversion and digital comparators. However, such a modification would be made at the sacrifice of speed and is not generally preferred at this time. Also, the circuit of the invention may be used to maintain a constant power mode for other load control circuitry as would be apparent to one skilled in the art. These and other obvious modifications are intended to be included within the scope of this invention as defined by the following claims.

What is claimed is:

1. A constant power Circuit for causing a load having a predetermined power limit to dissipate power at a constant power level less than said predetermined power limit, comprising:

means responsive to the voltage across and current drawn by said load for determining whether the power dissipated by said load for a selected load demand exceeds said predetermined power limit for said load, said determining means comparing the power dissipated by said load for said selected load demand with an approximation of a constant power curve over a predetermined range of current and voltage and outputting an overpower signal during an overpower state in which said predetermined power limit for said load is exceeded by the power dissipated by said load for said selected load demand; and means responsive to said overpower signal and said selected load demand for regulating the power dissipated by said load during said overpower state whereby the magnitude of the power dissipated by said load during said overpower state is within a predetermined hysteresis band about said constant power level.

2. A constant power circuit as in claim 1, wherein said determining means comprises n comparators, n being at least 1, which receive a voltage signal proportional to the voltage across said load, a current signal proportional to the current drawn by said load and a predetermined reference level signal, each comparator comparing the sum of said voltage and current signals to said reference level signal and producing said overpower signal when the sum of said voltage and current signals exceeds said reference level signal for all n comparators.

3. A constant power circuit as in claim 3, wherein said voltage signal, current signal and predetermined reference level signal are inputted into each respective comparator across respective resistances selected for each comparator so as to define a power limit line approximating said constant power curve, said power limit line being unique for each comparator so as to form part of a linear piecewise approximation of said constant power curve.

4. A constant power circuit as in claim 3, wherein n=4 and said linear piecewise approximation of said constant power curve is accurate to within a 6% deviation of respective values of said constant power curve.

5. A constant power circuit as in claim 2, wherein said determining means further comprises hysteresis band setting means for setting the tolerance of said determining means whereby when said sum of said voltage and current signals exceeds said predetermined reference level signal by a predetermined amount the power dissipated by said load is reduced until the power dissipated by said load is a predetermined amount less than said predetermined reference level signal, the magnitude of the power dissipated by said load during said overpower state then being increased until said sum of said voltage and current signals is again said predetermined amount greater than said predetermined reference level signal.

6. A constant power circuit as in claim 5, wherein said hysteresis band setting means comprises first and second resistances connected between an overpower signal output of said determining means and a constant voltage level, the ratio of said first and second resistances defining the magnitude of said predetermined hysteresis band and the frequency of change from said reduction in the power dissipated by said load to said increase in the power dissipated by said load and vice-versa.

7. A constant power circuit as in claim 2, wherein said determining means comprises at least two comparators and the outputs of each of said comparators are logically ORed with each other, said overpower signal being produced only when none of said comparators indicates that the sum of said voltage and current signals is less than said reference level signal.

8. A constant power circuit as in claim 1, further comprising range selecting means for scaling the magnitudes of said voltage across and current drawn by said load to a predetermined range, for selectively changing the magnitude of the constant power curve for all currents and voltages, and for outputting said scaled voltage and current signals to said determining means.

9. A constant power circuit as in claim 1, further comprising a decoupling diode for decoupling said power regulating means in the absence of said overpower signal.

10. A constant power circuit as in claim 1, further comprising a low pass filter for filtering said overpower signal, said low pass filter having a capacitance which is charged by said overpower signal in said overpower state until an upper limit of said hysteresis band is reached and then discharged until a lower limit of said hysteresis band is reached.

11. A constant power circuit as in claim 10, further comprising a resistance through which the instantaneous voltage across the load is applied directly to said capacitance for precharging said capacitance to a voltage level approximating said instantaneous voltage.

12. A constant power circuit as in claim 1, wherein said power regulating means comprises a linear differential amplifier having a signal representative of the power dissipated by said load in accordance with said selected load demand supplied to a first input thereof and said overpower signal supplied to a second input thereof, the output of said amplifier being fed back as positive feedback to said first input during said overpower state such that the magnitude of said power dissipated by said load in accordance with said selected load demand during said overpower state is adjusted to track the overpower signal supplied to said second input of said amplifier.

13. A constant power circuit as in claim 1, further comprising a power stage responsive to a regulating output of said power regulating means for providing to the load a current which is proportional to the voltage of said regulating output in said overpower state.

14. A constant power circuit for causing a load having a predetermined power limit to dissipate power at a constant power level less than said predetermined power limit, comprising:
means for applying the output of a power source to the load;
means for determining whether the power dissipated by said load in response to said power source output exceeds said predetermined power limit for said load by comparing the level of the power dissipated by said load with an approximation of a constant power curve defined in a current-voltage plane over a selected range of current and voltage, and outputting an overpower signal during an overpower state in which said power dissipated by said load exceeds said predetermined power limit; and
means responsive to said overpower signal for regulating the level of the power dissipated by said load so as to be within a predetermined hysteresis band about said constant power level during said overpower state.

15. A constant power circuit as in claim 14, wherein said determining means comprises n comparators, n being at least 1, which receive a voltage signal proportional to the voltage across said load, a current signal proportional to the current drawn by said load and a predetermined reference level signal, each comparator comparing the sum of said voltage and current signals to said reference level signal and producing said overpower signal when the sum of said voltage and current signals exceeds said reference level signal for all n comparators.

16. A constant power circuit as in claim 15, wherein said determining means further comprises hysteresis band setting means for setting the tolerance of said determining means such that when said sum of said voltage and current signals exceeds said predetermined reference level signal by a predetermined amount the power dissipated by said load is reduced until the level of the power dissipated by said load is a predetermined amount less than said predetermined reference level signal, the power dissipated by said load then being increased during said overpower state until said sum of said voltage and current signals is again said predetermined amount greater than said predetermined reference level signal.

17. A constant power circuit as in claim 14, wherein said power regulating means comprises a linear differential amplifier having a load demand signal supplied to a first input thereof and said overpower signal supplied to a second input thereof, the output of said amplifier being fed back as positive feedback to said first input during said overpower state such that the power dissipated by said load is adjusted to track the overpower signal supplied to said second input of said amplifier.

18. A constant power circuit for causing a load having a predetermined power limit to dissipate power at a nonzero constant power level less than said predetermined power limit, comprising:
means for detecting an overpower state of said load; and
nonlinear feedback means responsive to said detecting means for regulating the level of the power dissipated by said load so as to remain at said constant power level during said overpower state.

19. A constant power circuit as in claim 18, wherein said nonlinear feedback means regulates the level of the power dissipated by said load during said overpower state so as to be within a predetermined hysteresis band about said constant power level, and wherein said nonlinear feedback means has steady states at a power level present when the load is zero and at a power level dissipated by the load when a programmed load demand is applied to the load.

20. A constant power circuit as in claim 19, wherein said programmed load demand follows a voltage or current value requested by a user during a normal operating state and follows said regulating signal during said overpower state.

21. A method of causing a load having a predetermined power limit to dissipate power at a constant power level less than said predetermined power level, comprising the steps of:
detecting an overpower state of said load; and
nonlinearly regulating the level of the power dissipated by said load so as to remain at said constant power level during said overpower state.

22. A method as in claim 21, wherein said detecting step includes the steps of:
programming said load to maintain one of a constant current level and constant voltage level there across during a normal operating state;
detecting said overpower state when said programmed level causes said load to dissipate power at a level in excess of said predetermined power limit for said load; and
outputting an overpower signal when said overpower state is detected.

23. A method as in claim 22, wherein said nonlinear regulating step includes the steps of:
overriding the programmed level during said overpower state; and
nonlinearly regulating the power dissipated by the load in accordance with the level of said overpower signal.

* * * * *